United States Patent [19]

Fritsch et al.

[11] Patent Number: 4,699,745
[45] Date of Patent: Oct. 13, 1987

[54] PROCESS FOR THE PRODUCTION OF POLYCARBONATE INJECTION-MOULDED SHAPED ARTICLES

[75] Inventors: Karl-Herbert Fritsch, Bergisch Gladbach; Peter Bier, Krefeld, both of Fed. Rep. of Germany

[73] Assignee: Bayer Aktiengesellschaft, Leverkusen, Fed. Rep. of Germany

[21] Appl. No.: 741,924

[22] Filed: Jun. 6, 1985

[30] Foreign Application Priority Data

Jun. 9, 1984 [DE] Fed. Rep. of Germany ....... 3421647

[51] Int. Cl.$^4$ .................. B29B 9/06; B29C 45/00; B29C 47/00; D02J 1/22
[52] U.S. Cl. .................. 264/143; 264/210.8; 264/290.5; 264/328.18; 264/331.21
[58] Field of Search ............... 264/2.2, 140, 141, 143, 264/210.7, 210.8, 328.16, 328.17, 328.18, 328.19, 331.12, 331.15, 331.21, 178 F, 181, 290.5

[56] References Cited

U.S. PATENT DOCUMENTS

| | | | |
|---|---|---|---|
| 3,005,236 | 10/1961 | Reichle et al. | 264/290.5 |
| 3,007,204 | 12/1961 | Veiel et al. | 264/290.2 |
| 3,026,273 | 11/1962 | Engles | 264/143 X |
| 3,424,832 | 1/1969 | Chisholm | 264/143 |
| 3,796,785 | 3/1974 | Rest et al. | 264/288.4 |
| 4,540,534 | 9/1985 | Grendol | 264/2.2 |

FOREIGN PATENT DOCUMENTS 1190167 4/1965 Fed. Rep. of Germany.
910322 11/1962 United Kingdom.

OTHER PUBLICATIONS

Kunststoff-Handbuch, vol. VI/Polyamide, 1966, Carl-Hanser-Verlag, pp. 336–343.

Primary Examiner—Jeffery Thurlow
Assistant Examiner—Leo B. Tentoni
Attorney, Agent, or Firm—Gene Harsh; Joseph C. Gil; Aron Preis

[57] ABSTRACT

The present invention relates to a process for the production of thermoplastic polycarbonate injection-moulded shaped articles from polycarbonate melt strands, which is characterized in that polycarbonate melt strands are pressed through a circular orifice with a diameter of 1 to 8 mm, preferably 2 to 6 mm, and are then cooled to below their softening point, stretched in a ratio of between 1:1.5 and 1:8, preferably between 1:1.5 and 1:5, between room temperature and the softening point of the resulting polycarbonate strand, and are then granulated, and the resulting polycarbonate granules are processed in a known manner by the injection-moulding process at product temperatures of below 320° C. preferably below 300° C.

7 Claims, No Drawings

PROCESS FOR THE PRODUCTION OF POLYCARBONATE INJECTION-MOULDED SHAPED ARTICLES

The present invention relates to a process for the production of thermoplastic polycarbonate injection-moulded shaped articles from polycarbonate melt strands, which is characterised in that polycarbonate melt strands are pressed through a circular orifice with a diameter of 1 to 8 mm, preferably 2 to 6 mm, and are then cooled to below their softening point, stretched in a ratio of between 1:1.5 and 1:8, preferably between 1:1.5 and 1:5, between room temperature and the softening point of the resulting polycarbonate strand, and are then granulated, and the resulting polycarbonate granules are processed in a known manner by the injection-moulding process at product temperatures of below 320° C., preferably below 300° C.

Stretching of polycarbonate filaments and polycarbonate films is known. Additional subsequent shaping or further processing is not usual in this technology. (See, for example, U.S. Pat. No. 3,005,236).

The production of stretched structures is described in the two German Auslegeschriften (German Published Specifications) No. 1,190,167 and No. 1,164,644, but only films, foils and fibres are concretely referred to.

Stretching of other polycarbonate structures is only customary for polycarbonate sheets, this being achieved by rolling of the polycarbonate sheets.

Although U.S. Pat. No. 3,007,204, column 1, lines 20 to 33 describes generally the stretching of plastics, again only structures in the form of fibres and films are subsequently discussed in detail.

U.S. Pat. No. 3,796,785 describes a special process for stretching thermoplastic sheets, although their thickness again is in the region of customary films, that is to say preferably 0.07 mm and, in the stretched condition, 0.02 mm.

The stretching of thermoplastic sheets with thicknesses of 0.7 mm or more is thus not known from U.S. Pat. No. 3,796,785.

Thermoplastic injection-moulded shaped articles in the context of the invention are shaped articles which can be produced by the injection-moulding process and have a thickness of at least 0.7 mm; they thus differ from films, which can only be extruded or cast, from fibres, which can only be extruded or spun, and from those sheets which can only be extruded or have a thickness of less than 0.7 mm.

Preferred thermoplastic injection-moulded shaped articles in the context of the invention are those which can only be produced by the injection-moulding process.

The preferred thickness of the thermoplastic injection-moulded shaped articles should be between 0.7 mm and 8 mm.

The thermoplastic injection-moulded shaped articles can in principle have any desired length and width, these dimensions depending on the injection mould and the intended use. However, by definition, the length and width are both greater than the minimum thickness of 0.7 mm. Examples of values for the length are between 5 mm and 2,500 mm; examples of values for the width are between 2 mm and 500 mm.

The production of polycarbonate melt strands, for example from polycarbonate granules, powder or solution, is customary. The strands can be produced, for example, via an extruder at temperatures between 180° C. and 400° C. Single-screw or twin-screw mixing extruders, for example, are suitable; spinning pumps, such as, for example, gear pumps, can also be used in a known manner.

The pressing through a circular orifice with a diameter of 1 to 8 mm can be carried out, for example, at temperatures of 180° C. to 400° C. with the application of pressures of 0.5 atmospheres to 200 atmospheres. Orifices in the context of the process according to the invention are single or multiple circular dies.

The polycarbonate melt strand is cooled by air or, preferably, by being passed through a waterbath. The temperature of the water here is, for example, 10°-60° C.

The preferred temperature range for the subsequent stretching, at which cooling of the polycarbonate melt strand takes place, is between 80° and 150° C. or, in the case of crystalline polycarbonates, is 186°-230° C.

Stretching of the cooled polycarbonate strand can be carried out by methods such as are customary and known for stretching of films or fibres. Examples of possible stretching units are those which are described in Kunststoff-Handbuch (Plastics Handbook), Volume VI /"Polyamide" ("Polyamides"), 1966, Carl-Hanser-Verlag, pages 336 to 343. Thus, for example, bisphenol A polycarbonates can be stretched in one or more stretching and temperature stages in the ratio according to the present invention at temperatures between 80° C. and 230° C. on a stretching machine from Reifenhauser KG, type RS 13.

The stretched strand is granulated in a known manner using customary granulators, such as are available, for example, from Automatik, Dreher, Condux, Cumberland and the like. The dimensions of the cylindrical granules are, for example, 0.5-3 mm, in thickness, and 1-3 mm, in length.

Processing by the injection-moulding process can be carried out, for example, on standard injection-moulding machines, such as are used for thermoplastics. The product temperature should be below 320° C., preferably below 300° C.; in general about 180° C., preferably 240° C., are to be regarded as the lower temperature limit for the injection-moulding process.

Thermoplastic aromatic polycarbonates which can be employed for producing the polycarbonate melt strand, that is to say for the process according to the invention, are those based on diphenols with a $\overline{M}w$ (weight-average molecular weight, determined by light scattering or by the relative solution viscosity in $CH_2Cl_2$ at room temperature and at a concentration of 0.5 g per 100 ml of $CH_2Cl_2$) of between 10,000 and 100,000, preferably between 15,000 and 80,000 and in particular between 20,000 and 50,000.

These thermoplastic, aromatic polycarbonates can be linear or branched, for example in a known manner by incorporation of small amounts, preferably 0.05 to 2 mol %, based on the diphenols employed, of compounds which are trifunctional or more than trifunctional, for example those with three or more than three phenolic OH groups.

Both the linear and the branched thermoplastic aromatic polycarbonates are known from the literature.

Amounts of up to 30% by weight of low molecular weight aromatic polycarbonates with average degrees of polymerisation of between 2 and 30 can also be admixed to the high molecular weight thermoplastic aromatic polycarbonates with an $\overline{M}w$ of between 10,000 and 100,000.

To establish the molecular weight $\overline{M}w$ of the polycarbonates, chain stoppers, such as, for example, phenol, halogenophenols or alkylphenols, can be employed in the calculated amounts in a known manner.

Examples of diphenols which are suitable for the preparation of the aromatic polycarbonates which can be used according to the invention are hydroquinone, resorcinol, dihydroxydiphenyls, bis-(hydroxyphenyl)-alkanes, bis-(hydroxyphenyl)-cycloalkanes, bis-(hydroxyphenyl) sulphides, bis-(hydroxyphenyl) ethers, bis-(hydroxyphenyl) sulphoxides, bis(hydroxyphenyl) sulphones and $\alpha,\alpha'$-bis(hydroxyphenyl)diisopropylbenzenes and their nuclear-alkylated and nuclear-halogenated derivatives. Diphenols of this type are known from the literature.

Examples of preferred diphenols are 4,4'-dihydroxydiphenyl, 2,4'-bis-(4-hydroxyphenyl)-2-methyl-butane, $\alpha,\alpha'$-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, 2,2-bis-(3-bromo-4-hydroxyphenyl)-propane, bis-(3,5-dimethyl-4-hydroxyphenyl), bis-(3,5-dimethyl-4-hydroxyphenyl)-alkanes, such as 2,4-bis-(3,5-dimethyl-4-hydroxyphenyl)-2-methylbutane, bis-(3,5-dimethyl-4-hydroxyphenyl)-cycloalkanes, such as 1,1-bis-(3,5-dimethyl-4-hydroxyphenyl)-cyclohexane, bis((3,5-dimethyl-3-hydroxyphenyl) sulphide, bis-(3,5-dimethyl-4-hydroxyphenyl) ether, $\alpha,\alpha'$-bis-(3,5-dimethyl-4-hydroxyphenyl)-p-or -m-diisopropylbenzene and bis-(3,5-dimethyl-4-hydroxyphenyl) sulphone.

Examples of particularly preferred diphenols are 2,2-bis-(4-hydroxyphenyl)-propane, 2,2-bis-(3,5-dibromo-4-hydroxyphenyl)-propane, 2,2-bis-(3,5-dichloro-4-hydroxyphenyl)-propane, 1,1-bis-(4-hydroxyphenyl)-cyclohexane, bis-(3,5-dimethyl-4-hydroxyphenyl)-methane and 2,2-bis(3,5-dimethyl-4-hydroxyphenyl)-propane.

These diphenols are either known from the literature (see, for example, H. Schnell, "Chemistry and Physics of Polycarbonates", Interscience Publishers, New York, 1964, U.S. Pat. No. 3,028,365 or U.S. Pat. No. 3,879,348), or can be prepared by processes which are known from the literature.

Thermoplastic aromatic polycarbonates which are suitable for the process according to the invention are homopolycarbonates and copolycarbonates of the above-mentioned diphenols. Mixtures of these homopolycarbonates or these copolycarbonates or of these homopolycarbonates with these copolycarbonates are also suitable.

Particularly preferred homo- or co-polycarbonates are those of the diphenols mentioned as particularly preferred, very particularly preferred thermoplastic aromatic polycarbonates being the polycarbonates based on 2,2-bis-(4-hydroxyphenyl)-propane as homopolycarbonates and as copolycarbonates with up to 10 mol %, based on the moles of diphenols, of other particularly preferred diphenols. phenols.

The customary additives, such as lubricants, mould release agents, nucleating agents, stabilisers against moisture, heat and the action of UV, flameproofing agents and colorants can be added in the usual amounts in polycarbonate chemistry to the thermoplastic aromatic polycarbonates or can be incorporated during production of the polycarbonate melt strand for the process according to the invention.

The process according to the invention allows the pattern of properties of thermoplastic injection-moulded shaped articles made of aromatic thermoplastic polycarbonates to be improved in a simple manner and thereby allows a large number of various shapes of the polycarbonate shaped articles to be achieved.

The thermoplastic injection-moulded shaped articles produced by the process according to the invention are used industrially in a known manner in all cases where polycarbonate injection-moulded shaped articles have already hitherto been used, that is to say, for example, in the construction of electrical appliances, household articles and in the automobile sector.

EXAMPLE

A homopolycarbonate of bis-2,2-(4-hydroxyphenyl)-propane with a relative viscosity of 1.30 (measured on a 0.5% strength solution in methylene chloride at 25° C. in a Ubbelohde viscometer) was melted in a twin-screw extruder, type ZSK 30, from Werner & Pfleiderer, and extruded through a 4 mm circular die. The product temperature was 285° C. The melt strand was cooled to a temperature of about 35° C. in a waterbath and stretched in a stretching unit by the roll stretching method. The stretching unit consisted of three chromed pairs of rolls standing vertically one on top of the other with a roll diameter of 25 cm. The pairs of rolls can be driven separately. The strand is passed through two heating zones located between the pairs of rolls. The temperature of the heating zones is adjustable between 20° C. and 300° C. In the present case, the circumferential speed between the first pair of rolls and the second was chosen so that a stretching ratio of 1:2 resulted. The temperature of the heating zones was 140° C. The third pair of rolls was used exclusively for transportation of the strand. The strand was granulated with an ASG 2 granulator from Automatik, and the granules were injection-moulded to test pieces on an Arburg injection-moulding machine (model 270) at 300° C. The tensile strength and elongation at break measured on the test pieces (DIN 53444) are compared in Table 1 with those of corresponding test pieces which have been produced from the granules of the non-stretched melt strand by means of injection-moulding.

TABLE 1

| | Product | Stretching conditions Temperature (°C.) | Stretching ratio | Tensile strength (MPa) | Elongation at break (%) |
|---|---|---|---|---|---|
| Example | Test piece of stretched material | 140 | 1:2 | 83.0 | 121 |
| Comparison Example | Test piece of non-stretched material | — | — | 74.0 | 110 |

We claim:
1. A process for the production of thermoplastic polycarbonate injection-molded shaped articles, in which polycarbonate melt strands are pressed through a circular orifice with a diameter of 1 to 8 mm, and are then cooled to below their softening point, stretched in a ratio of between 1:1.5 to 1:8, between room temperature and the softening point of the resulting polycarbonate strand, and are then granulated, and the resulting polycarbonate granules are processed by the injection molding process at a product temperature of below 320° C.

2. A process according to claim 1, in which the polycarbonate strand is stretched in a ratio of between 1:1.5 and 1:5.

3. A process according to claim 1 wherein the product temperature used is below 300° C.

4. A process according to claim 1, in which the circular orifice has a diameter of 2 to 6 mm.

5. A process according to claim 1, in which the circular orifice is in the form of a multiple circular orifice die.

6. A process according to claim 1, in which the polycarbonate melt strands are cooled by being passed through a water bath which has a temperature of 10° to 60° C.

7. A process according to claim 1, in which the polycarbonate melt strands are stretched at temperature between 80° and 150° C., or at a temperature between 186° and 230° C. if the polycarbonate is a crystalline polycarbonate.

* * * * *